Dec. 1, 1942.  C. W. SINCLAIR  2,303,710
BRAKE
Filed Aug. 21, 1939  3 Sheets-Sheet 1
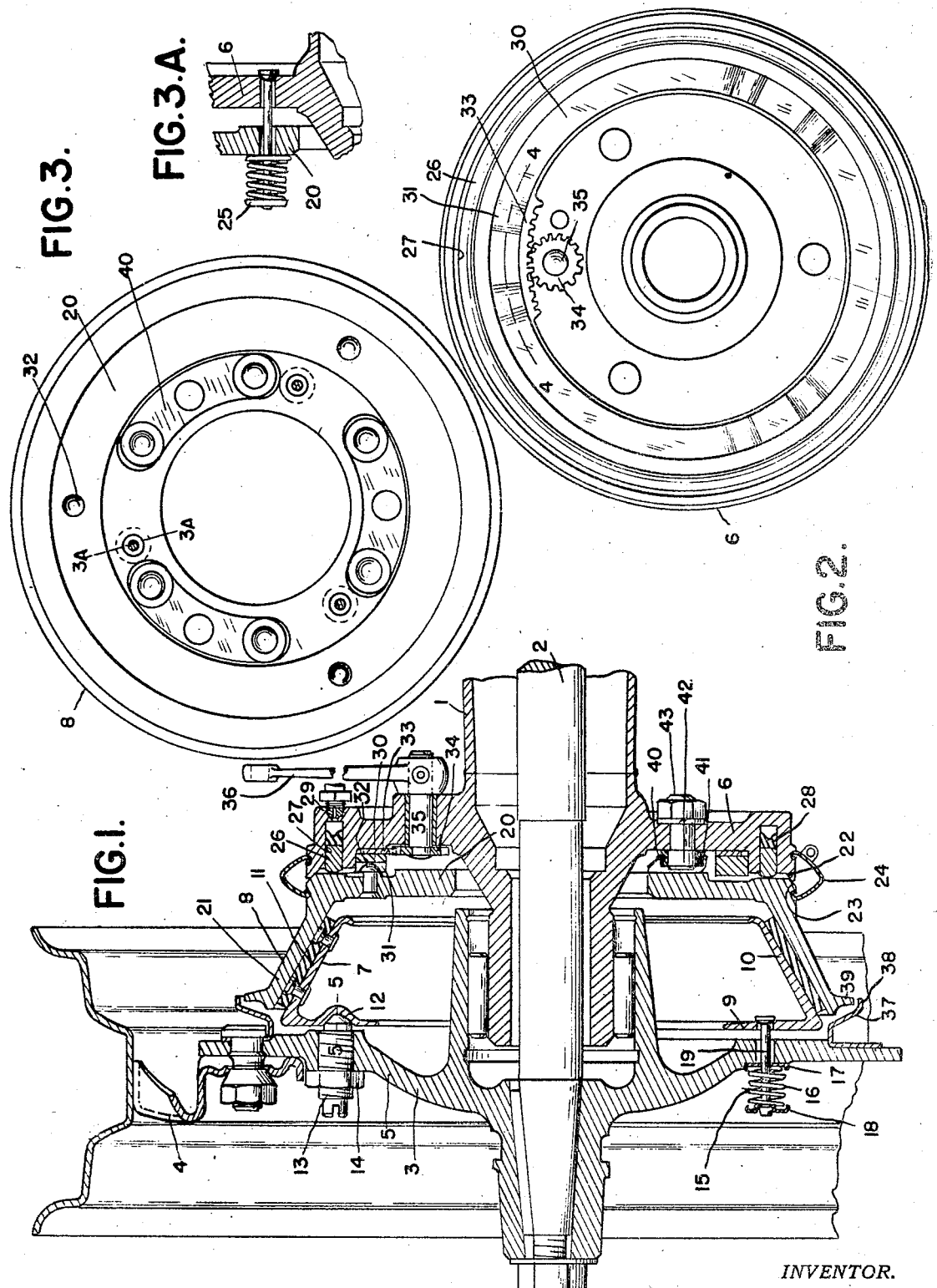
INVENTOR.
CHARLES W. SINCLAIR
BY
ATTORNEYS Dec. 1, 1942.  C. W. SINCLAIR  2,303,710
BRAKE
Filed Aug. 21, 1939   3 Sheets—Sheet 2

INVENTOR.
CHARLES W. SINCLAIR
BY
ATTORNEYS

Dec. 1, 1942.   C. W. SINCLAIR   2,303,710
BRAKE
Filed Aug. 21, 1939   3 Sheets-Sheet 3
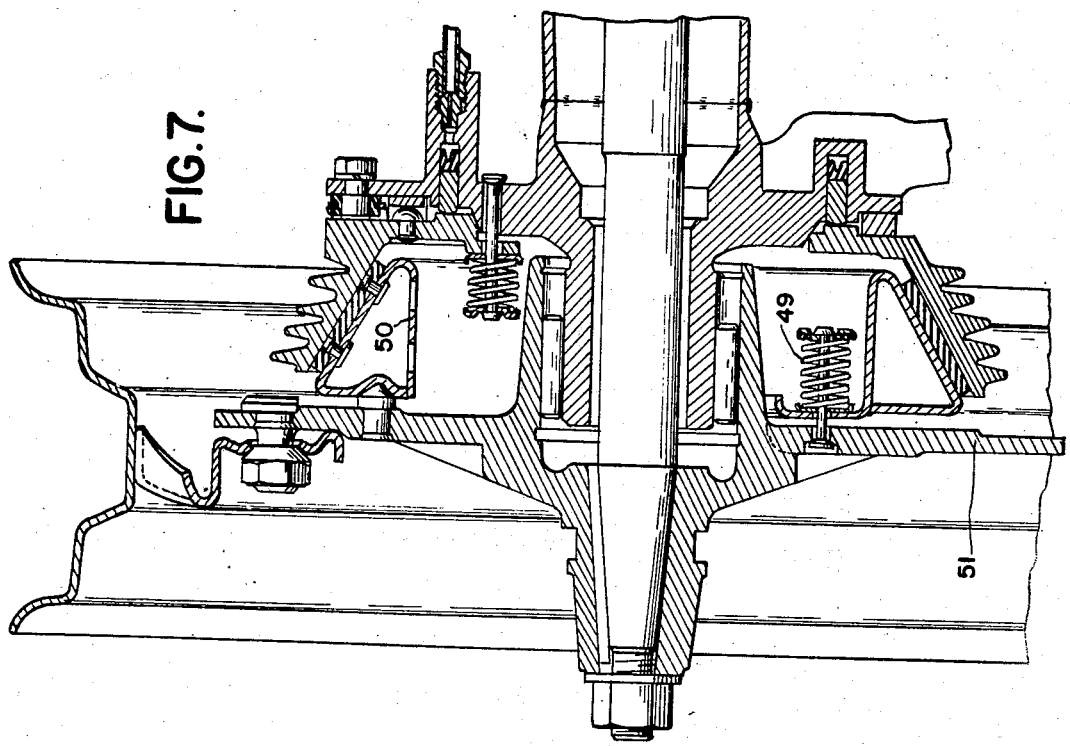
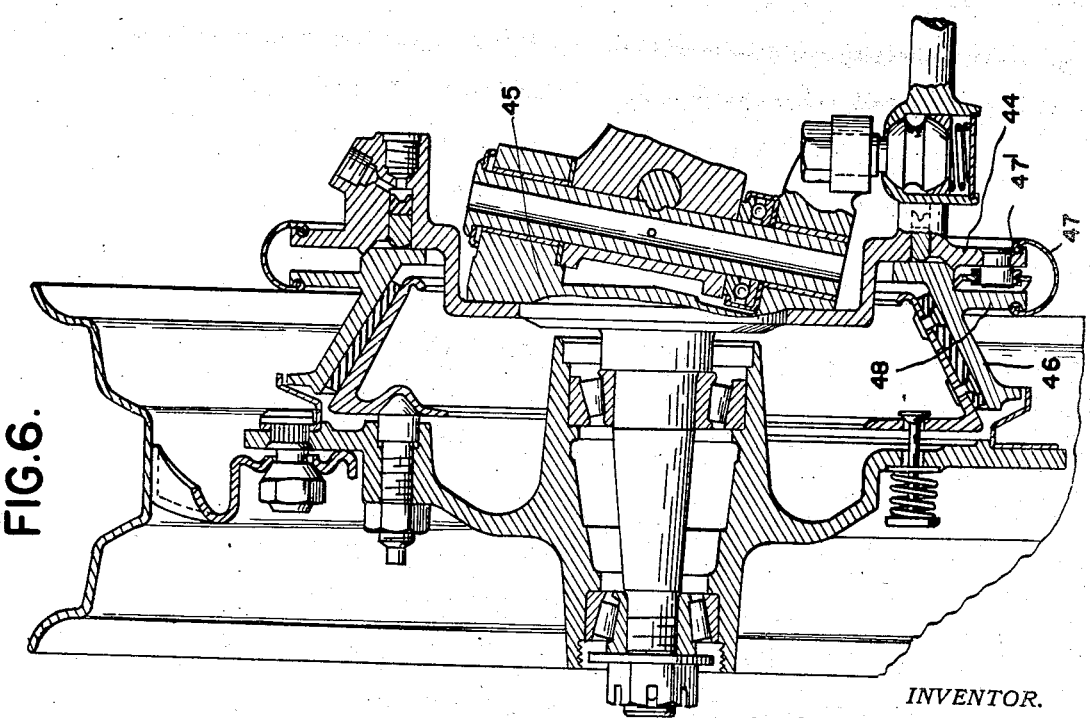
INVENTOR.
CHARLES W. SINCLAIR
BY
ATTORNEYS Patented Dec. 1, 1942

2,303,710

UNITED STATES PATENT OFFICE 2,303,710

BRAKE

Charles W. Sinclair, Detroit, Mich., assignor to Kelsey-Hayes Wheel Company, Detroit, Mich., a corporation of Delaware Application August 21, 1939, Serial No. 291,264

14 Claims. (Cl. 188—71)

The invention relates to brakes and refers more particularly to brakes of that type having brake shoe and brake drum members one of which is bodily movable toward and away from the other. More especially, the brake is of that type in which its friction members are of the cone type.

The invention has for one of its objects to provide an improved construction of brake in which one of its friction members is energized upon engagement of the other of its members to effect more firm engagement.

The invention has for another object to provide a brake construction having provision for the centering of the two friction members when in engagement with each other.

The invention has for a further object to provide a brake construction having means for centering the friction members when out of engagement or in operative position.

These and other objects of the invention will become apparent from the following description and claims, taken in connection with the accompanying drawings, in which Figure 1 is a vertical section through a brake embodying my invention;

Figure 2 is an outboard elevation of the carrier element and parts carried thereby;

Figure 3 is an inboard elevation of the brake drum and parts carried thereby;

Figure 3A is a cross section on the line 3A—3A of Figure 3;

Figures 6, 7 and 8 are views similar to Figure 1 showing other embodiments of my invention.

Figure 4:
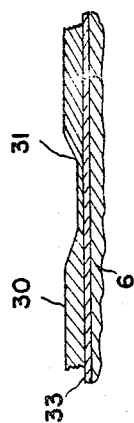
Figure 4 is a cross section on the line 4—4 of Figure 2.
Figure 5:
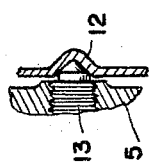
Figure 5 is a cross section on the line 5—5 of Figure 1.

The brake is designed particularly for use on automobiles in conjunction with their wheels.

As illustrated in Figures 1 to 5 inclusive, 1 is the rear axle housing, 2 a jack shaft, 3 the wheel hub keyed upon the outer end of the jack shaft, and 4 the wheel demountably secured upon the fixed flange 5 of the hub. 6 is the carrier element fixed upon the axle housing and, as shown, welded to its outer end.

7 and 8 are the brake shoe and the brake drum, respectively. The brake shoe normally rotates with the wheel, while the brake drum is held from rotation through the carrier element. The brake shoe has the annular web 9 which extends at the inboard side of the fixed flange 5. The brake shoe also has the annular conical flange 10, the outer face of which is provided with a suitable friction lining 11. The web 9 is provided with the annular series of conical bosses 12 depressed toward the inboard side and adapted to receive the conical ends of the screws 13 which are threaded into the fixed flange 5 and adapted to be locked in their adjusted positions by means of the nuts 14. 15 are resilient holding devices between the screws 13 and adapted to resiliently urge the web of the shoe toward the fixed flange of the hub and to seat the web bosses upon the conical ends of the screws. Each resilient device, as shown, comprises the coil spring 16 at the outboard side of the fixed flange and located between the washers 17 and 18. It also comprises the shank 19 having a head at the outboard side of the washer 18 and a head at the inboard side of the web 9, the shank extending through the web, fixed flange, coil spring and washers. This construction normally centers the brake shoe upon the rotatable element and at the same time normally rotates the brake shoe with the rotatable element.

The brake drum 8 has the annular web 20 which extends at the outboard side of the carrier element 6 and the annular conical flange 21 inclined at the same angle as the lining 11. The brake drum in its inoperative position, at which time it is out of engagement with the brake shoe, is centered upon the carrier element 6 by means of the beveled face 22 at the periphery of the carrier element engaging the beveled face 23 at the periphery of the web of the brake drum. The joint between the brake drum and carrier element is protected from water, dust, and the like, by means of the V-shaped ring 24 which is resilient and has beads at its edges engaging grooves in the peripheries of the carrier element and brake drum. The ring also serves to retract the brake drum from engagement with the brake shoe. In addition, resilient retracting devices 25 serve to return the brake drum to its inoperative position. Each device is similar to the resilient device 15, with the exception that its shank extends through the web 20 of the brake drum and the carrier element.

The brake drum is adapted to be axially moved in an outboard direction into operative position, at which time it engages the brake shoe and, as shown in the present instance, the means for axially moving the brake drum may be accomplished both hydraulically and mechanically. The hydraulic means comprises the annular piston 26 engageable with the web 20 of the brake drum and the annular cylinder 27 extending axially and formed in the carrier element 6 and receiving the piston and adapted to receive a fluid under pressure at its inboard end. An annular channel-shaped sealing member 28 abuts the inboard end of the piston and opens toward the inboard end of the cylinder. Fluid under pressure exerted by the master cylinder (not shown) is admitted through the fitting 29.

The mechanical actuating means comprises the ring 30 mounted upon the carrier element and formed with the angularly spaced cams 31 adapted upon rotation of the ring to engage the projections 32 formed upon and at the inboard side of the web 20 of the brake drum. These projections, as shown, are in the nature of heads upon rivets fixedly secured to the web. The ring 30 is provided with the rack 33 which is engaged by the pinion 34 fixed upon the outboard end of the shaft 35 journaled in the carrier element. The shaft is adapted to be rotated by means of the lever 36 which is adapted to be connected to a suitable control member (not shown).

37 is an annular sheet metal guard permanently secured to the fixed flange 5 of the hub by means of the bolts used in securing the wheel to the fixed flange. This guard has the axial portion 38 which extends over and is slightly spaced from the annular flange 39 formed at the free edge of the brake flange 21.

For the purpose of holding the brake drum from rotation and at the same time providing for centering of the brake drum upon the brake shoe when the two are engaged, the brake drum is connected to the carrier element by link means which comprises the annular series of flexible straps 40. Each strap is suitably connected, as by rivets, at its ends to the web 20 of the brake drum and also connected at its middle to the bushing 41 freely sleeved upon the enlargement 42 of the pin 43 fixed to the carrier element. The bushings are yieldable and preferably formed of rubber and permit sufficient movement of the straps to allow alignment of the brake drum upon the brake shoe when the former is engaged with the latter.

In operation it will be seen that the brake drum may be moved axially in an outboard direction either by the hydraulic actuating means or the mechanical actuating means, or by both, and that the brake drum is free to center itself upon the brake shoe in the event that the two are not in axial alignment. It will also be seen that upon engagement of the brake drum with the brake shoe, assuming the wheel to be rotating, the retarding effort exerted upon the brake shoe serves to allow the wheel to rotate forwardly relative to the brake shoe at which time the cone-shaped bosses upon the web of the brake shoe ride over the cone-shaped ends of the centering screws to force the brake shoe axially in an inboard direction and into more firm engagement with the brake drum. Thus, it will be seen that the brake shoe is energized upon engagement of the brake drum with the brake shoe to secure a more effective braking action.

The brake construction illustrated in Figure 6 is designed for use with a front wheel. The carrier element is fixed upon the steering spindle 45 instead of an axle housing. In this construction the brake drum 46 is retracted to its inoperative position by means of the resilient annular shield or guard 47 which is U-shaped and has the beads 47' at its edges engaging grooves in the inboard side of the carrier element 44 and the outboard side of the flange 48 formed upon the brake drum near its web. As shown, this front wheel brake is hydraulically actuated only. However, its operation is the same as that illustrated in Figures 1 to 5 inclusive.

The brake illustrated in Figure 7 differs essentially from that illustrated in Figures 1 to 5 inclusive in locating the resilient devices 49 for normally holding the brake shoe 50 in its retracted position at the inboard side of the fixed flange 51 of the hub and inside the brake shoe. The devices 49 otherwise are the same as the devices 15.

Figure 8:
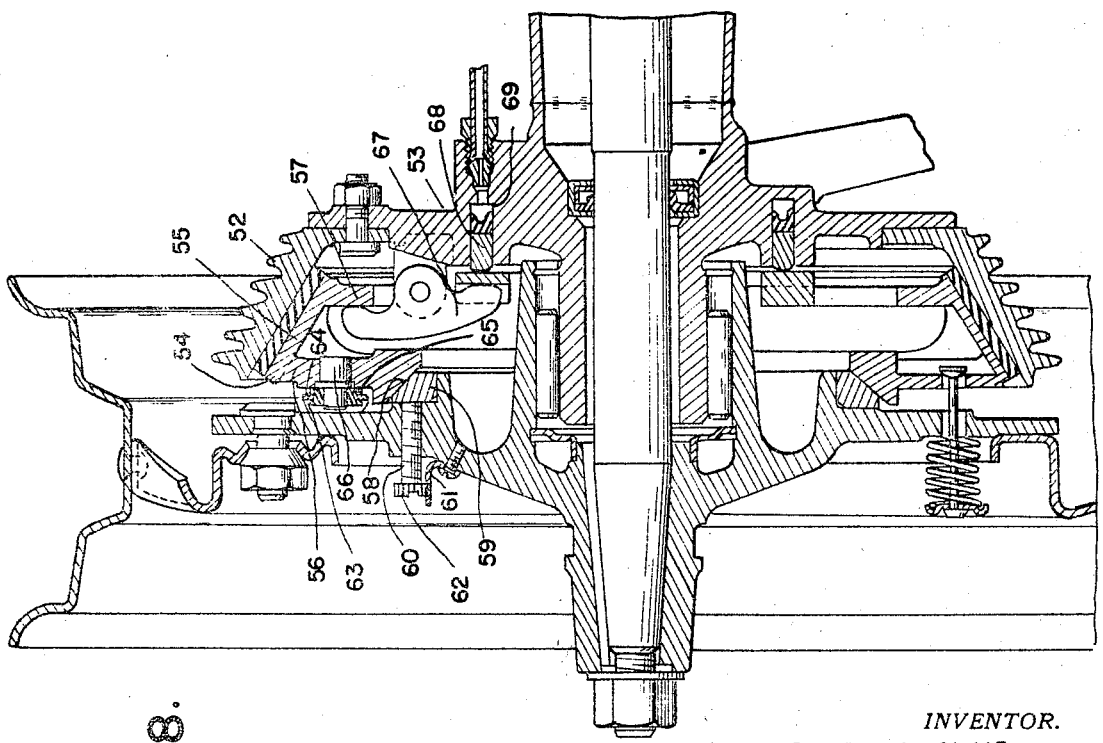

Figure 8 illustrates another embodiment of my invention in which the brake drum 52 is fixedly secured to the carrier element 53 and the brake shoe 54 held from rotation relative to the rotatable element, is adapted to be moved axially in an inboard direction into engagement with the brake drum, and is capable of centering with the brake drum when the two are in engagement. The brake shoe has the conical flange 55 and the radial webs 56 and 57 at its outboard and inboard ends, respectively. The inner portion of the outboard web is provided with the beveled face 58 for engaging a correspondingly beveled face upon the ring 59 when the brake shoe is in retracted or inoperative position. The ring 59 is adapted to be adjusted by means of the annular series of screws 60 threaded into the fixed flange of the hub and these screws are adapted to be held in their adjusted positions by means of the springs 61 secured at one end to the fixed flange and engaging serrations in the heads 62 of the screws. The brake shoe is held from rotation relative to the fixed flange or rotatable element by the link or strap means 63 which is formed of the annular series of flexible straps 64 connected at their ends to the fixed flange and mounted at their middles upon the rubber bushings 65. The bushings are slidably mounted upon the pins 66 secured in the outboard web 56. The brake shoe is adapted to be moved axially in an inboard direction by means of the rocker arms 67 which are pivoted at their middles upon the carrier element 53 and are engageable at their outer ends with the inboard web 57 of the brake shoe. The inner ends of these rocker arms are adapted to be actuated by the annular piston 68 axially slidable in the annular cylinder 69 formed in the carrier element.

What I claim as my invention is:

1. A brake for a rotatable element comprising a shoe normally rotatable with said element, a brake drum movable axially into engagement with said shoe, and cooperating means upon said element and shoe operable upon engagement of said drum with said shoe during rotation of said element to move said shoe into more firm engagement with said drum.

2. A brake for a rotatable element comprising a shoe normally rotatable with said element, a brake drum movable axially into engagement with said shoe and cooperating means upon said element and shoe operable upon engagement of said drum with said shoe during rotation of said element to effect axial movement of said shoe into more firm engagement with said drum.

3. A brake for a rotatable element comprising a shoe member and a brake drum member, both of said members being movable axially toward and into engagement with each other, one of said members being normally rotatable with said element and the other of said members being held from rotation, means for moving said other of said members axially into engagement with said one of said members, and cooperating means upon said element and said one of said members operable upon engagement of said other of said members with said one of said members during rotation of said element for effecting axial movement of said one of said members into more firm engagement with said other of said members.

4. A brake for a rotatable element comprising relatively axially movable shoe and brake drum members, a carrier element and flexible strips connecting one of said members to one of said elements providing for axial movement of said one of said members and also centering thereof with the other of said members when the two members are engaged.

5. A brake for a rotatable element comprising a shoe normally rotatable with said element, a carrier element, a brake drum supported upon said carrier element and movable axially into engagement with said shoe, cooperating means upon said carrier element and drum for normally centering said brake drum upon said carrier element, and link means between said carrier element and drum for holding said drum from rotation relative to said carrier element and permitting centering of said drum upon said shoe.

6. A brake for a rotatable element comprising a shoe rotatable with said element, a carrier element, a brake drum supported upon said carrier element, means for moving said shoe axially into engagement with said drum, cooperating means upon said rotatable element and shoe for normally centering said shoe upon said rotatable element, and link means between said rotatable element and shoe for holding said shoe from rotation relative to said rotatable element and permitting centering of said shoe relative to said drum.

7. A brake for a rotatable element comprising an annular shoe normally rotatable with said element and having a conical braking face, a carrier element, a brake drum supported upon said carrier element and having a conical braking face, means for supporting said drum upon said carrier element to normally center said drum upon said carrier element when said drum is in inoperative position and to permit said drum to center upon said shoe when said drum is in operative position, and means for supporting said shoe upon said rotatable element comprising cam means and spring means for normally centering said shoe relative to said rotatable element, said cam means also serving to effect axial movement of said shoe relative to said rotatable means to more firmly engage said shoe with said drum.

8. A brake for a rotatable element comprising a shoe member and a brake drum member, both of said members being movable axially toward and into engagement with each other, means connecting one of the members to said element permitting limited rotation of the latter member relative to the element in dependence upon the application of a retarding force on the latter member and the other of said members being held from rotation, means for moving said other of the members axially into engagement with said one member to apply a retarding force on the said one member, and means responsive to relative rotation between the said one member and element to move the said one member axially into more firm engagement with the said other member.

9. A brake for a rotatable element comprising a shoe normally rotatable with said element, means connecting the shoe to the element permitting limited rotation of the shoe relative to the element in dependence upon the application of a retarding force on the shoe, a brake drum movable axially into engagement with said shoe to apply a retarding force on the shoe, and means responsive to rlative rotation between the shoe and element to move the shoe axially into more firm engagement with the brake drum.

10. A brake for a rotatable element comprising a shoe driven by said element and having a limited rotative movement relative to the element, a brake drum movable axially into engagement with said shoe, and means for positioning the shoe on said element operable upon engagement of the brake drum with the shoe to effect axial movement of the shoe into more firm engagement with the brake drum.

11. A brake for a rotatable element comprising a brake drum having an annular brake flange and having a web portion, a carrier element, a shoe normally rotatable with said rotatable element and engageable with the annular brake flange, means connecting the brake drum to the carrier element permitting movement of the brake drum axially into engagement with said shoe and permitting limited shifting movement of the brake drum in a plane parallel to the plane of rotation of the rotatable element to center the drum relative to the brake shoe upon engagement of the brake drum with said shoe, an annular piston upon the carrier element engageable with the web portion of said drum to axially move the latter, and an annular cylinder formed in the carrier element and receiving said piston and adapted to receive fluid under pressure.

12. A brake for a rotatable element comprising a brake drum having an annular brake flange and having a web portion, a carrier element supporting said brake drum, a shoe engageable with the brake flange and connected to the rotatable element for limited shifting movement relative to the latter in a plane parallel to the plane of rotation of said rotatable element to center the shoe relative to the brake drum, an annular piston upon said carrier element, means upon said carrier element actuable by said piston for effecting movement of the shoe into engagement with the brake drum, and an annular cylinder formed in said carrier element and receiving said piston and adapted to receive fluid under pressure.

13. A brake for a rotatable element comprising a brake drum having an annular brake flange and having a web portion, a carrier element, a shoe normally rotatable with said rotatable element and engageable with the brake flange, means connecting the brake drum to the carrier element permitting movement of the drum axially into engagement with said shoe and permitting limited shifting movement of the drum in a plane parallel to the plane of rotation of the rotatable element to center the drum relative to the brake shoe upon engagement of said drum with the shoe, an annular member supported on the carrier element for rotation and having a rack, cooperating cam means on the annular member and web of the brake drum responsive to rotation of the annular member to move said brake drum axially into engagement with the shoe, and a pinion carried by the carrier element and engageable with said rack for rotating the annular member.

14. A brake for a rotatable element comprising a carrier element, a shoe member, a brake drum member, one of said members being rotatable with said element, the other of said members being movable axially into engagement with said one member, cooperating means upon said rotatable element and said rotatable member operable upon engagement of the axially movable member with the rotatable member during rotation of said element to move said rotatable member axially relative to the rotatable element into more firm engagement with the axially movable member, and means other than said last named means for connecting one of said members to one of the elements aforesaid in a manner to permit shifting movement of the last named member relative to the last mentioned element to provide for aligning the members when the latter are engaged with each other.

CHARLES W. SINCLAIR.